US011964726B2

United States Patent
Kubotera (10) Patent No.: US 11,964,726 B2
(45) Date of Patent: Apr. 23, 2024

(54) SHOCK ABSORBER (71) Applicant: SHOWA CORPORATION, Gyoda (JP)

(72) Inventor: Yuka Kubotera, Fukuroi (JP)

(73) Assignee: HITACHI ASTEMO, LTD., Hitachinaka (JP)

(*) Notice: Subject to any disclaimer, the term of this patent is extended or adjusted under 35 U.S.C. 154(b) by 916 days.

(21) Appl. No.: 16/999,705

(22) Filed: Aug. 21, 2020

(65) Prior Publication Data

US 2020/0377168 A1 Dec. 3, 2020

Related U.S. Application Data

(63) Continuation of application No. PCT/JP2018/016983, filed on Apr. 26, 2018.

(51) Int. Cl.
*F16F 9/32* (2006.01)
*B60G 15/06* (2006.01)
(Continued)

(52) U.S. Cl.
CPC .......... *B62K 25/283* (2013.01); *B60G 15/063* (2013.01); *B60G 15/068* (2013.01);
(Continued)

(58) Field of Classification Search
CPC ........ F16F 9/3271; F16F 9/3242; F16F 9/369; F16F 2228/066; F16F 9/065;
(Continued)

(56) References Cited

U.S. PATENT DOCUMENTS 4,298,102 A * 11/1981 Nishikawa ........... B60G 15/062
137/493.9
4,881,750 A * 11/1989 Hartmann .............. B62K 21/20
188/269
(Continued)

FOREIGN PATENT DOCUMENTS

JP 06-087743 U 12/1994
JP 2002-089604 A 3/2002
(Continued)

OTHER PUBLICATIONS

International Search Report dated Jun. 19, 2018 for the corresponding International Application No. PCT/JP2018/016983.
(Continued)

*Primary Examiner* — Kevin Hurley
*Assistant Examiner* — Michael R Stabley
(74) *Attorney, Agent, or Firm* — Leason Ellis LLP; Edward J. Ellis; Melvin C. Garner (57) ABSTRACT

A shock absorber includes: a damper tube accommodating a piston in a reciprocally movable manner; a suspension spring for urging the damper tube and a piston rod in opposite directions; a first male screw provided on an outer peripheral surface of the damper tube; a first nut screwed into the first male screw so as to enable a spring load of the suspension spring to be adjusted; a second nut screwed into the first male screw so as to enable a position of the first nut in an axial direction of the damper tube to be fixed; a second male screw having a reverse screw configuration to the first male screw and provided on the outer peripheral surface of the damper tube; and a damper head screwed into the second male screw so as to enable the damper head to cover one end portion of the damper tube.

12 Claims, 4 Drawing Sheets

(51) Int. Cl.
*B60G 17/02* (2006.01)
*B60G 17/08* (2006.01)
*B62K 25/04* (2006.01)
*B62K 25/28* (2006.01)
*F16F 9/36* (2006.01)
*F16F 9/06* (2006.01)

(52) U.S. Cl.
CPC ............ *B60G 17/021* (2013.01); *B60G 17/08* (2013.01); *F16F 9/3242* (2013.01); *F16F 9/3271* (2013.01); *F16F 9/369* (2013.01); *B60G 2202/312* (2013.01); *B60G 2204/1242* (2013.01); *B60G 2204/128* (2013.01); *B60G 2204/129* (2013.01); *B60G 2206/41* (2013.01); *B60G 2300/12* (2013.01); *B60G 2500/20* (2013.01); *B60G 2600/20* (2013.01); *B60G 2800/162* (2013.01); *B62K 2025/048* (2013.01); *F16F 9/065* (2013.01); *F16F 2222/12* (2013.01); *F16F 2228/066* (2013.01)

(58) Field of Classification Search
CPC ............ B62K 25/283; B62K 2025/048; B60G 15/068; B60G 17/021; B60G 2206/41; B60G 2300/12; B60G 17/08
See application file for complete search history.

(56) References Cited

U.S. PATENT DOCUMENTS

| | | | |
|---|---|---|---|
| 5,044,614 A * | 9/1991 | Rau | B60G 17/021 267/221 |
| 6,948,730 B2 * | 9/2005 | Morita | B62M 11/06 280/260 |
| 8,960,389 B2 * | 2/2015 | McAndrews | B62K 25/08 188/322.22 |
| 10,203,013 B2 * | 2/2019 | Tokunaga | F16F 9/348 |
| 11,105,390 B2 * | 8/2021 | Hulstein | F16F 9/3242 |
| 11,199,237 B2 * | 12/2021 | Anderson | F16F 9/3465 |
| 2006/0055146 A1 * | 3/2006 | Ueno | B62K 21/06 280/280 |
| 2009/0033011 A1 * | 2/2009 | Chen | F16F 9/3235 267/286 |
| 2017/0284498 A1 | 10/2017 | Tokunaga et al. | |
| 2018/0119834 A1 * | 5/2018 | Johnson | B60C 29/02 |
| 2018/0233842 A1 * | 8/2018 | Carletti | H01R 13/005 |
| 2020/0049221 A1 * | 2/2020 | Anderson | F16F 9/48 |

FOREIGN PATENT DOCUMENTS

| | | |
|---|---|---|
| JP | 2005-024057 A | 1/2005 |
| JP | 2017-180706 A | 10/2017 |

OTHER PUBLICATIONS

Written Opinion dated Jun. 19, 2018 for the corresponding International Application No. PCT/JP2018/016983.

* cited by examiner

SHOCK ABSORBER

CROSS-REFERENCE TO RELATED APPLICATION(S)

This application is a continuation of PCT application No. PCT/JP2018/016983 filed on Apr. 26, 2018, the content of which is incorporated herein by reference.

FIELD OF THE INVENTION

The present invention relates to a shock absorber particularly suitable for use in vehicles.

BACKGROUND OF THE INVENTION

As a shock absorber used in vehicles, for example, there is a rear cushion of a motorcycle, which is a kind of saddle-ride type vehicle on which an occupant rides. The rear cushion is provided between a vehicle body of the motorcycle and a rear wheel support mechanism.

A general shock absorber uses an oil-filled cylindrical damper tube, a piston which is reciprocally accommodated in the damper tube, a piston rod provided in the piston, and a suspension spring which urges the piston rod and the damper tube in opposite directions as its basic components.

An upper end of the damper tube is closed by a damper head. This damper head is formed integrally with the damper tube. In general, the damper tube and the damper head are constituted by an integrally formed cast product. Because it is a cast product, the thickness of each part must be increased. For this reason, the diameter of the damper tube or damper head becomes large.

The shock absorber placed in a narrow space of the motorcycle is preferably as small as possible. In order to reduce the size of the shock absorber, it is conceivable to construct the damper tube and the damper head by separate members. A shock absorber in which a damper tube and a damper head are separated is known, for example, from Patent Literature 1 (JP-A-2017-180706).

The shock absorber known in Patent Literature 1 can close an upper end of the damper tube with the damper head by screwing a female screw of the damper head into a male screw on an outer peripheral surface of the damper tube. Since the damper tube does not need to be formed by a cast product, it can be made smaller in diameter. As a result, the size of the shock absorber can be reduced.

A spring load of the suspension spring can be adjusted by a spring load adjusting nut. This spring load adjusting nut is screwed into the male screw. The position of the spring load adjusting nut with respect to the damper tube is locked by a lock member. This lock member is constituted by, for example, a lock nut which can be screwed into the male screw like the spring load adjusting nut.

When adjusting the spring load of the suspension spring in a state where the shock absorber known in Patent Literature 1 is mounted on a motorcycle, a pair of dedicated tools is generally used. The assumed procedure of adjusting the spring load is as follows. First, after loosening a lock nut, the spring load is adjusted by adjusting the amount of screwing of a spring load adjusting nut to a male screw. After the adjustment is completed, the lock nut is re-tightened by a second tool, the other of the pair of dedicated tools, while the spring load adjusting nut is suppressed by a first tool which is one of the pair of dedicated tools. This completes the adjustment work.

With the adjustment procedure described above, even when the lock nut is tightened, a damper tube will not try to rotate with the lock nut. Therefore, when the spring load is adjusted according to the assumed procedure, the male screw of the damper tube will not loosen with respect to a female screw of a damper head.

However, as a result of investigating the actual condition of spring load adjustment, the present inventor has newly found that, depending on the situation when adjusting the spring load, a dedicated tool may not be able to be used and the adjustment operation may be performed in a procedure different from the assumed procedure described above. For example, there is a case where a dedicated tool is not at hand, or an emergency is assumed. An example of an emergency is when re-adjusting the spring load during a motocross race using a motorcycle. Since the spring load is readjusted in a situation where there is no time to delay, there is no time to remove the shock absorber from the vehicle body and readjust. Also, there is no time to select a dedicated tool from a large number of tools. Inevitably, it is assumed that the lock nut is loosened or tightened using other tools at hand, such as a screwdriver and a hammer.

In this case, the lock nut may be excessively tightened so that the locks of the spring load adjusting nut and the lock nut are not loosened. When it is tightened excessively, the two nuts will be integrated (fixed) with the damper tube. Due to the excessive tightening force at this time, the damper tube tries to rotate with the lock nut. However, the damper head does not rotate because it is connected to a vehicle body of the motorcycle. As a result, since the damper tube rotates with respect to the damper head, a male screw of the damper tube is loosened with respect to a female screw of the damper head.

As mentioned above, the damper tube is filled with oil. In order to maintain the performance of the shock absorber, it is important to enhance the oil sealing performance between the damper head and the damper tube. Looseness of the screw is disadvantageous in improving the sealing performance.

An object of the invention is to provide a technique capable of further improving the oil sealing performance between a damper head and a damper tube even when a spring load is adjusted by a procedure different from an expected procedure.

SUMMARY OF THE INVENTION

A shock absorber related to the present invention includes:
- a piston rod;
- a piston supported by the piston rod;
- a damper tube accommodating the piston in a reciprocally movable manner and capable of being filled with oil;
- a suspension spring for urging the damper tube and the piston rod in opposite directions;
- a first male screw provided on an outer peripheral surface of the damper tube;
- a first nut screwed into the first male screw so as to enable a spring load of the suspension spring to be adjusted;
- a second nut screwed into the first male screw so as to enable a position of the first nut in an axial direction of the damper tube to be fixed;
- a second male screw having a reverse screw configuration to the first male screw and provided on the outer peripheral surface of the damper tube; and a damper head screwed into the second male screw so as to enable the damper head to cover one end portion of the damper tube.

Basically, especially when the first nut and second nut and the damper head are located near each other, it is preferable to combine male screws into which all of those can be screwed together and provide them on an outer peripheral surface of the damper tube in order to increase the productivity of screw processing.

On the other hand, in the invention, the male screw provided on the outer peripheral surface of the damper tube is divided into two parts, a first male screw and a second male screw. The first male screw can screw in a first nut and a second nut. The second male screw can screw in a damper head. When an excessive tightening force acts on the second nut, the first nut and the second nut are integrated with respect to the damper tube. Due to this excessive tightening force, a torque is generated in the damper tube in a tightening direction.

However, the second male screw is a reverse screw to the first male screw. When the damper tube turns in the tightening direction of each nut (first nut and second nut), the second male screw of the damper tube tightens against the female screw of the damper head. Therefore, it is possible to prevent the second male screw of the damper tube from being loosened with respect to the female screw of the damper head. When the damper tube turns in the tightening direction of each nut, the second male screw of the damper tube tightens against the female screw of the damper head, so there is no risk of oil leaking from a portion between the damper head and the damper tube. In other words, even when the spring load is adjusted by a procedure different from the assumed procedure, the oil sealing performance between the damper head and the damper tube can be further improved. As a result, the performance of the shock absorber can be easily maintained by a simple configuration.

DETAILED DESCRIPTION OF THE INVENTION

An embodiment for carrying out the invention will be described below with reference to the accompanying drawings.

Figure 1:
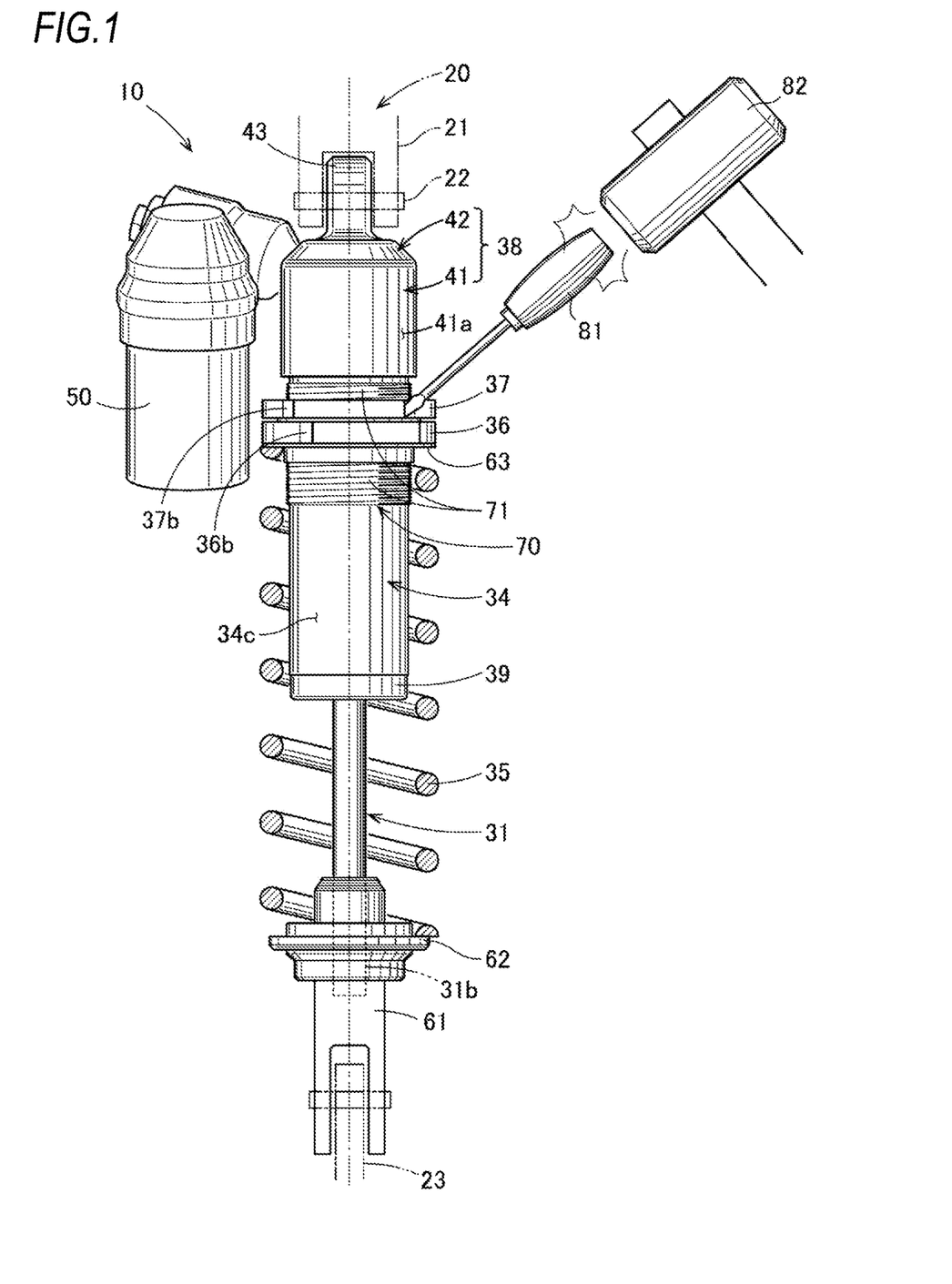
FIG. 1 is a side view of a shock absorber according to the invention.

As illustrated in FIG. 1, a shock absorber 10 is employed in, for example, a vehicle and is used as a rear cushion of a motorcycle 20, which is a kind of a saddle-ride type vehicle on which an occupant rides, as an example.

Figure 2:
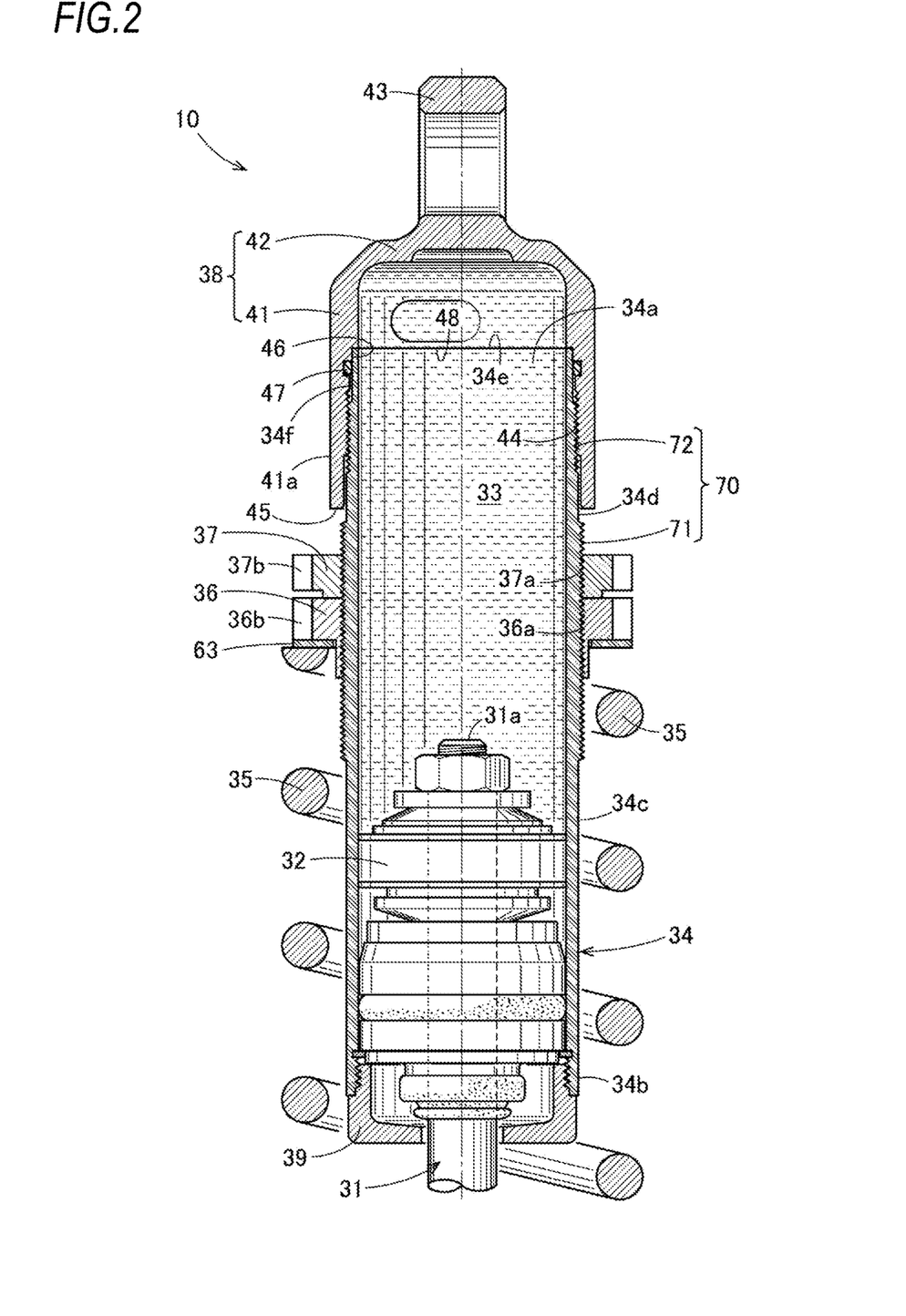
FIG. 2 is a cross-sectional view around a damper tube, a damper head, a piston, and a suspension spring illustrated in FIG. 1.

As illustrated in FIGS. 1 and 2, the shock absorber 10 has a single-tube type shock absorber configuration including a piston rod 31, a piston 32 supported by one end portion 31a (first end portion 31a) of the piston rod 31, a damper tube 34 which accommodates the piston 32 in a reciprocating manner and can be filled with oil 33, a suspension spring 35 for urging the damper tube 34 and the piston rod 31 in opposite directions, a first nut 36 (spring load adjusting nut 36) for adjusting the spring load of the suspension spring 35, a second nut 37 (lock nut 37) for fixing the position of the first nut 36 in an axial direction (vertical direction in the drawing of FIGS. 1 to 4. The same applies hereinafter.) of the damper tube 34, and a damper head 38 for closing one end portion 34a (first end portion 34a) of the damper tube 34.

As described above, the damper tube 34 (main pipe 34) and the damper head 38 (upper metal 38) are constituted by separate members. Therefore, only the damper head 38 can be constituted by a cast product without constituting the damper tube 34 by a cast product. The damper tube 34 is configured by a metal pipe such as a cylindrical steel pipe. Since the damper tube 34 does not need to be made into a cast product, it can be made thinner, and thus the diameter can be reduced accordingly. As a result, the shock absorber 10 can be reduced in size and weight, so that there is a high degree of freedom in arrangement of the motorcycle 20 in a narrow space.

The other end portion 34b (second end portion 34b) of the damper tube 34 is closed by a lower cap 39. The lower cap 39 has a structure (hereinafter, the structure of the lower cap 39 is referred to as a "screw-in structure") which can be screwed into the second end 34b of the damper tube 34.

Hereinafter, the shock absorber 10 will be described in detail. As illustrated in FIGS. 1 and 2, the damper head 38 has a cap-like configuration and is an integrally molded product including a cylindrical tube portion 41 into which the first end portion 34a of the damper tube 34 can be fitted and a closing portion 42 closing one end of the tube portion 41.

Further, the shock absorber 10 includes a sub-tank 50 (reservoir tank 50) which communicates with the inside of the damper head 38 and is integrated with the damper head 38. More specifically, the sub-tank 50 is disposed adjacent to the damper tube 34 and the damper head 38 with a predetermined gap therebetween such that the axial direction thereof is substantially parallel to an axial direction of the damper tube 34. Further, the sub-tank 50 is disposed such that the lower end thereof is located lower than the lower end of the first nut 36 and the upper end thereof is located higher than the upper end of the second nut 37 in a side view of the shock absorber 10. In other words, the sub-tank 50 is arranged in parallel in the axial direction of the damper tube 34 and is arranged on the side of the damper tube 34. The first nut 36 and the second nut 37 are arranged at positions overlapping the sub-tank 50 based on a height direction of the damper tube 34.

The outline of the sub-tank 50 will be described. The sub-tank 50 has a built-in bag-shaped bladder (not illustrated) having elasticity. The bladder is filled with gas. Inside the sub-tank 50, the space outside the bladder constitutes an oil reservoir and communicates with the inside of the damper head 38.

As illustrated in FIG. 1, a first support portion 43 is provided at a tip of the damper head 38. The first support portion 43 is supported by a support shaft 22 on a vehicle body 21 of the motorcycle 20. A second support portion 61 is provided at the other end 31b (second end 31b) of the piston rod 31. The second support portion 61 can support a rear wheel of the motorcycle 20 via a rear wheel support mechanism 23 such as a link mechanism or a swing arm.

As illustrated in FIG. 1, the suspension spring 35 is constituted by a compression coil spring. Both ends of the suspension spring 35 are supported by a retainer 62 provided at the second end portion 31b of the piston rod 31 and the first nut 36. A spring seat 63 is interposed between the suspension spring 35 and the first nut 36. However, the presence or absence of the spring seat 63 is optional.

Figure 3:
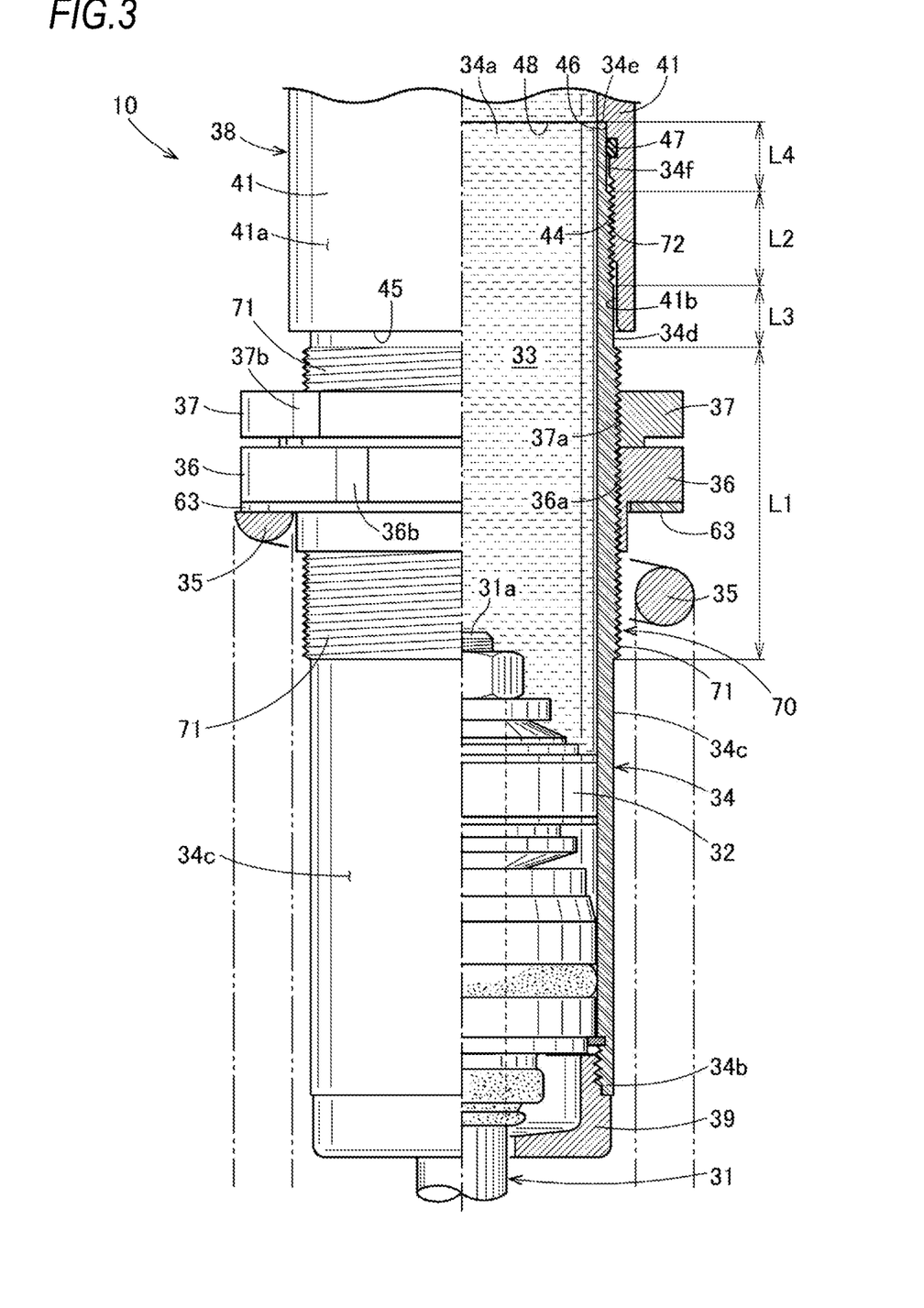
FIG. 3 is a side view mainly illustrating a half section of a configuration in which a spring load adjusting nut, a lock nut, and a damper head are screwed into the damper tube illustrated in FIG. 2.
Figure 4:
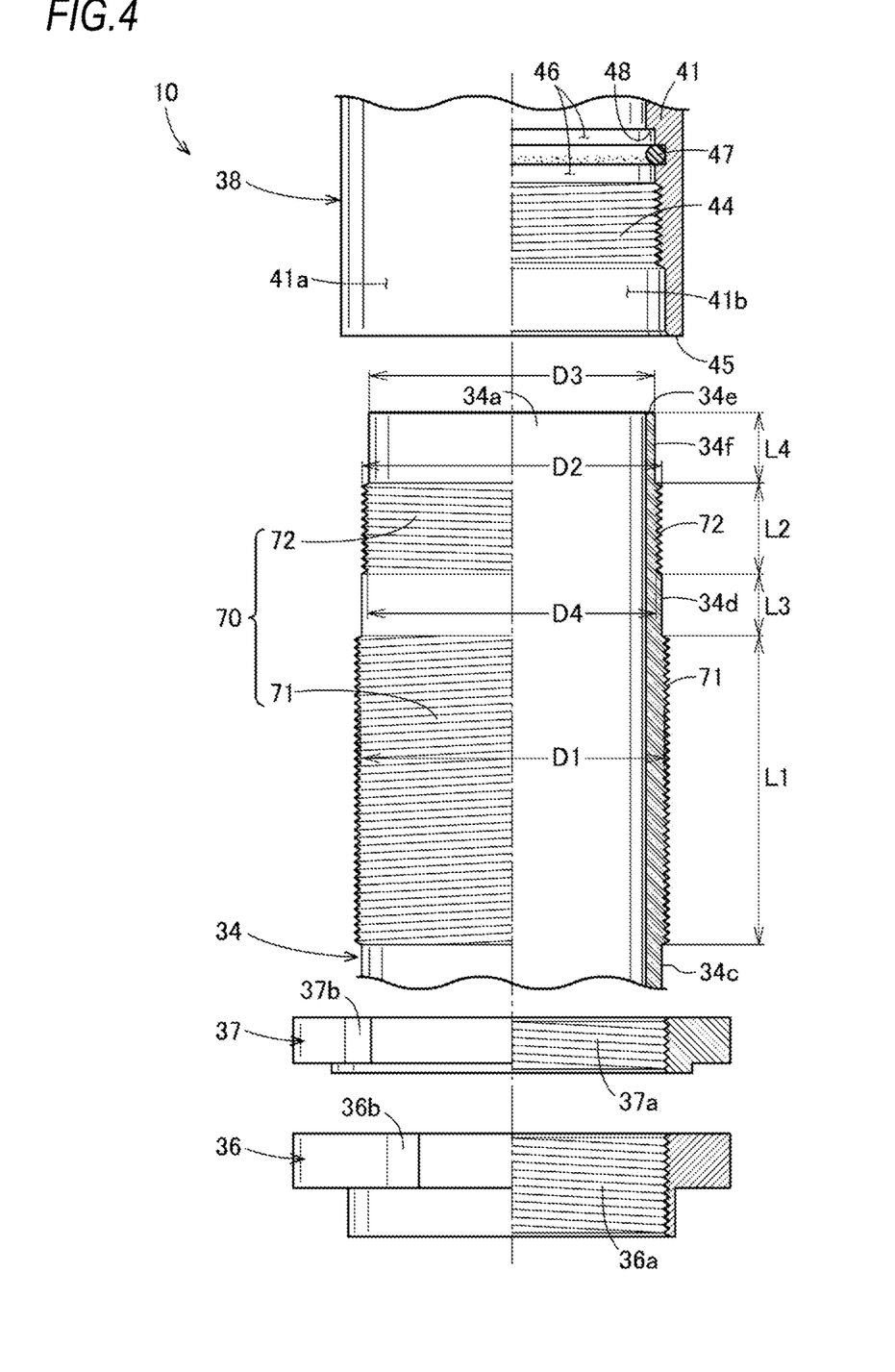
FIG. 4 is an exploded view of a configuration in which the spring load adjusting nut, the lock nut, and the damper head are screwed into the damper tube illustrated in FIG. 3.

As illustrated in FIGS. 3 and 4, a male screw 70 is formed on an outer peripheral surface 34c of the damper tube 34. The male screw 70 is divided into two, a first male screw 71 and a second male screw 72.

The first male screw 71 is formed by a "right-hand screw" and is provided on the outer peripheral surface 34c of the damper tube 34. The first male screw 71 can screw in the first nut 36 and the second nut 37. A length L1 of the first male screw 71 in the axial direction of the damper tube 34 is set in consideration of the adjustment range of the suspension spring 35. A female screw 36a of the first nut 36 and a female screw 37a of the second nut 37 are the same "right-hand screw" as the first male screw 71.

The second male screw 72 is formed of a left-hand screw which is a "reverse screw" with respect to the first male screw 71 and is provided on the outer peripheral surface 34c above the first male screw 71 in the axial direction. The second male screw 72 can screw in the damper head 38. A length L2 of the second male screw 72 in the axial direction is set so that the damper head 38 can be securely and stably screwed into the damper tube 34. A female screw 44 provided on the inner peripheral surface of the damper head 38 and screwed into the second male screw 72 is the same "left-hand screw" as the second male screw 72.

The first male screw 71 and the second male screw 72 are separated by a "non-screw portion 34d" having no screw. The non-screw portion 34d is a space where the first male screw 71 and the second male screw 72 are discontinuous and is formed on the outer peripheral surface 34c of the damper tube 34. A length L3 of the non-screw portion 34d may be short.

As mentioned above, the first male screw 71 is preferably a right-hand screw and second male screw 72 is preferably a left-hand screw. This is because a general screw is often constituted by a right-hand screw. For this reason, an operator who adjusts the spring load of the suspension spring 35 tends to have a preconception that the first male screw 71 and the first nut 36 and the second nut 37 are also right-hand screws. In particular, when the adjustment operation is performed quickly, it is preferable to configure the first male screw 71 with a right-hand screw in order to enhance workability.

An outer diameter D2 of the second male screw 72 is smaller (D1>D2) than a root diameter D1 of the first male screw 71.

It is preferable that the first nut 36 and the second nut 37 are constituted by grooved nuts for spanners to which a hook spanner (not illustrated) can be applied. The grooved nuts 36 and 37 for spanners (first nut 36 and second nut 37) have spanner grooves 36b and 37b to which the hook spanner can be applied. In general, even when a dedicated tool is not at hand, a screwdriver 81 and a hammer 82 illustrated in FIG. 1 are often at hand. Using the spanner grooves 36b and 37b, the first nut 36 and the second nut 37 can be relatively easily turned by the screwdriver 81 and the hammer 82.

The second nut 37 is located on an opposite side of the suspension spring 35 from the first nut 36. Therefore, the second nut 37 is unlikely to directly receive the spring load of the suspension spring 35 like the first nut 36. The durability of the second nut 37 can be lower than that of the first nut 36. Therefore, it is preferable that the second nut 37 is made of an aluminum alloy having acceptable durability and good workability.

The damper tube 34 has a smooth sealing surface 34f on a part of the outer peripheral surface 34c. A range L4 of the sealing surface 34f extends from an end surface 34e of the damper tube 34 to a proximal end of the second male screw 72. A diameter D3 of the sealing surface 34f is smaller (D3<D4) than a root diameter D4 of the second male screw 72.

In an inner peripheral surface 41b (that is, an inner peripheral surface 41b of the tube portion 41) of the damper head 38, a female screw 44 is provided deeper than an open distal end surface 45 and a smooth sealing surface 46 is provided deeper than the female screw 44.

A portion between the sealing surface 34f of the damper tube 34 and the sealing surface 46 of the damper head 38, that is, between the outer peripheral surface 34c of the damper tube 34 and the inner peripheral surface 41b of the damper head 38 is sealed by a sealing member 47 such as an O-ring. Therefore, it is possible to prevent the oil 33 filled in the damper tube 34 from leaking outside.

In the inner peripheral surface 41b of the damper head 38, the innermost end of the sealing surface 46 is a step surface. This inner end wall 48 is referred to as "positioning end 48". When the end surface 34e of the damper tube 34 inserted into the damper head 38 comes in contact with the positioning end 48, a longitudinal position of the damper tube 34 with respect to the damper head 38 is determined.

As illustrated in FIG. 3, in the screwing structure of the lower cap 39 into the second end portion 34b of the damper tube 34, the screw direction is preferably the same right-hand screw as the first male screw 71. This is because the screw between the damper tube 34 and the lower cap 39 is not loosened when the damper tube 34 turns rightward with the first nut 36.

The above description can be summarized as follows.

As illustrated in FIGS. 1 and 2, the shock absorber 10 of the invention includes,
 a piston rod 31,
 a piston 32 supported by the piston rod 31,
 a damper tube 34 accommodating the piston 32 in a reciprocally movable manner and capable of being filled with oil 33,
 a suspension spring 35 for urging the damper tube 34 and the piston rod 31 in opposite directions,
 a first male screw 71 provided on an outer peripheral surface 34c of the damper tube 34,
 a first nut 36 (spring load adjusting nut 36) screwed into the first male screw 71 so as to enable a spring load of the suspension spring 35 to be adjusted,
 a second nut 37 (lock nut 37) screwed into the first male screw 71 so as to enable a position of the first nut 36 in an axial direction of the damper tube 34 to be fixed,
 a second male screw 72 having a reverse screw configuration to the first male screw 71 and provided on the outer peripheral surface 34c of the damper tube 34, and
 a damper head 38 screwed into the second male screw 72 so as to enable the damper head 38 to cover one end portion 34a (first end portion 34a) of the damper tube 34.

Basically, especially when the first nut 36 and the second nut 37 and the damper head 38 are located close to each other, it is important to combine the male screw 70 capable of screwing all of them into one and to provide the male screw 70 on the outer peripheral surface 34c of the damper tube 34 in order to increase the productivity of the screw processing.

On the other hand, in the invention, the male screw 70 provided on the outer peripheral surface 34c of the damper tube 34 is separated into two, the first male screw 71 and the second male screw 72. The first male screw 71 can screw in the first nut 36 and the second nut 37. The second male screw 72 can screw in the damper head 38. When an excessive tightening force acts on the second nut 37, the first nut 36 and the second nut 37 are integrated with the damper tube 34. The torque in the tightening direction is generated in the damper tube 34 by the excessive tightening force.

However, the second male screw 72 is a reverse screw to the first male screw 71. When the damper tube 34 turns in the tightening direction of the nuts 36 and 37, the second male screw 72 of the damper tube 34 tightens against the female screw 44 of the damper head 38. Therefore, the second male screw 72 of the damper tube 34 can be prevented from loosening with respect to the female screw 44 of the damper head 38. There is no risk that oil leaks from a portion between the damper tube 34 and the damper head 38 due to the loosening of the screw. Therefore, the oil sealing property between the damper tube 34 and the damper head 38 can be further improved. As a result, the performance of the shock absorber 10 can be easily maintained by a simple configuration.

Further, as illustrated in FIG. 1, it is preferable that the shock absorber 10 of the invention further includes a first support portion 43 provided on the damper head 38 so as to enable the first support portion 43 to be supported on a vehicle body 21 of a saddle-ride vehicle 20 (motorcycle 20) and a second support portion 61 provided on the piston rod 31 so as to enable the second support portion 61 to support a rear wheel support mechanism 23 of the saddle-ride vehicle 20. With such a configuration, the shock absorber 10 is suitable for use as a rear cushion of the saddle-ride vehicle 20.

Further, as illustrated in FIG. 1, the shock absorber 10 of the invention further includes a sub-tank 50 communicating with an inside of the damper head 38 and integrated with the damper head 38, where
  the sub-tank 50 is arranged in parallel in the axial direction of the damper tube 34 and is arranged laterally to the damper tube 34, and
  the first nut 36 and the second nut 37 are arranged at positions overlapping the sub-tank 50 with reference to a height direction of the damper tube 34.

Therefore, it is suitable to be mounted on the saddle-ride vehicle 20.

Further, as illustrated in FIGS. 1 to 4, the shock absorber 10 of the invention includes,
  a piston rod 31,
  a piston 32 supported by the piston rod 31,
  a damper tube 34 accommodating the piston 32 in a reciprocally movable manner and capable of being filled with oil 33,
  a suspension spring 35 for urging the damper tube 34 and the piston rod 31 in opposite directions,
  a first male screw 71 provided on an outer peripheral surface 34c of the damper tube 34 and formed of a right-hand screw,
  a first nut 36 (spring load adjusting nut 36) screwed into the first male screw 71 so as to enable a spring load of the suspension spring 35 to be adjusted,
  a second nut 37 (lock nut 37) screwed into the first male screw 71 so as to enable a position of the first nut 36 in an axial direction of the damper tube 34 to be fixed,
  a second male screw 72 formed of a left-hand screw having an outer diameter D2 smaller than a root diameter D1 of the first male screw 71 and provided on the outer peripheral surface 34c of the damper tube 34,
  a damper head 38 screwed into the second male screw 72 so as to enable the damper head 38 to cover one end portion 34a (first end portion 34a) of the damper tube 34,
  a sealing member 47 for sealing a portion between an inner peripheral surface 41b of the damper head 38 and the outer peripheral surface 34c (sealing surface 34f) of the damper tube 34,
  a first support portion 43 provided on the damper head 38 so as to enable the first support portion 43 to be supported on a vehicle body 21 of a saddle-ride vehicle 20, a second support portion 61 provided on the piston rod 31 so as to enable the second support portion 61 to support a rear wheel support mechanism 23 of the saddle-ride vehicle 20, and
  a sub-tank 50 which communicates with an inside of the damper head 38, is integrated with the damper head 38, is arranged in parallel in the axial direction of the damper tube 34, is arranged laterally to the damper tube 34, and is arranged at a position overlapping the first nut 36 and the second nut 37 with reference to a height direction of the damper tube 34.

The shock absorber 10 according to the invention is not limited to the embodiment as long as the operations and effects of the invention are exhibited.

For example, in the invention, the shock absorber 10 only needs to be used for vehicles and can be used as a front cushion without being limited to a rear cushion. In addition, the shock absorber 10 can be employed in a tricycle of the saddle-ride type vehicle 20.

Also, by arranging the shock absorber 10 according to the invention upside down, it is possible to adopt a configuration in which the piston rod 31 is supported by the vehicle body 21 and the rear wheel support mechanism 23 is supported by the damper head 38.

In the shock absorber 10 according to the invention, the presence or absence of the sub-tank 50 is optional.

In addition, the shock absorber 10 according to the invention is not limited to a single-tube type and may be a so-called double-tube type configuration having a damper tube (double tube). This is because, even in a case of the double tube type, if oil leakage occurs, various parts are affected.

The shock absorber 10 of the invention is suitable for being used as a rear cushion of a saddle type vehicle.

What is claimed is:
1. A shock absorber, comprising:
  a piston rod;
  a piston supported by the piston rod;
  a damper tube accommodating the piston in a reciprocally movable manner and capable of being filled with oil;
  a suspension spring for urging the damper tube and the piston rod in opposite directions;
  a first male screw provided on an outer peripheral surface of the damper tube;
  a first nut screwed into the first male screw so as to enable a spring load of the suspension spring to be adjusted;
  a second nut screwed into the first male screw so as to enable a position of the first nut in an axial direction of the damper tube to be fixed;
  a second male screw having a reverse screw configuration to the first male screw and provided on the outer peripheral surface of the damper tube; and
  a damper head screwed into the second male screw so as to enable the damper head to cover one end portion of the damper tube.

2. The shock absorber according to claim 1, wherein the first male screw is a right-hand screw and the second male screw is a left-hand screw.

3. The shock absorber according to claim 2, wherein an outer diameter of the second male screw is smaller than a root diameter of the first male screw.

4. The shock absorber according to claim 2, further comprising:
a first support portion provided on the damper head so as to enable the first support portion to be supported on a vehicle body of a saddle-ride vehicle; and
a second support portion provided on the piston rod so as to enable the second support portion to support a rear wheel support mechanism of the saddle-ride vehicle.

5. The shock absorber according to claim 2, further comprising:
a sub-tank communicating with an inside of the damper head and integrated with the damper head, wherein
the sub-tank is arranged in parallel in the axial direction of the damper tube and is arranged laterally to the damper tube, and
the first nut and the second nut are arranged at positions overlapping the sub-tank with reference to a height direction of the damper tube.

6. The shock absorber according to claim 1, wherein an outer diameter of the second male screw is smaller than a root diameter of the first male screw.

7. The shock absorber according to claim 6, further comprising:
a first support portion provided on the damper head so as to enable the first support portion to be supported on a vehicle body of a saddle-ride vehicle; and
a second support portion provided on the piston rod so as to enable the second support portion to support a rear wheel support mechanism of the saddle-ride vehicle.

8. The shock absorber according to claim 6, further comprising:
a sub-tank communicating with an inside of the damper head and integrated with the damper head, wherein
the sub-tank is arranged in parallel in the axial direction of the damper tube and is arranged laterally to the damper tube, and
the first nut and the second nut are arranged at positions overlapping the sub-tank with reference to a height direction of the damper tube.

9. The shock absorber according to claim 1, further comprising:
a first support portion provided on the damper head so as to enable the first support portion to be supported on a vehicle body of a saddle-ride vehicle; and
a second support portion provided on the piston rod so as to enable the second support portion to support a rear wheel support mechanism of the saddle-ride vehicle.

10. The shock absorber according to claim 9, further comprising:
a sub-tank communicating with an inside of the damper head and integrated with the damper head, wherein
the sub-tank is arranged in parallel in the axial direction of the damper tube and is arranged laterally to the damper tube, and
the first nut and the second nut are arranged at positions overlapping the sub-tank with reference to a height direction of the damper tube.

11. The shock absorber according to claim 1, further comprising:
a sub-tank communicating with an inside of the damper head and integrated with the damper head, wherein
the sub-tank is arranged in parallel in the axial direction of the damper tube and is arranged laterally to the damper tube, and
the first nut and the second nut are arranged at positions overlapping the sub-tank with reference to a height direction of the damper tube.

12. A shock absorber, comprising:
a piston rod;
a piston supported by the piston rod;
a damper tube accommodating the piston in a reciprocally movable manner and capable of being filled with oil;
a suspension spring for urging the damper tube and the piston rod in opposite directions;
a first male screw provided on an outer peripheral surface of the damper tube;
a first nut screwed into the first male screw so as to enable a spring load of the suspension spring to be adjusted;
a second nut screwed into the first male screw so as to enable a position of the first nut in an axial direction of the damper tube to be fixed;
a second male screw having a reverse screw configuration to the first male screw and provided on the outer peripheral surface of the damper tube;
a damper head screwed into the second male screw so as to enable the damper head to cover one end portion of the damper tube;
a sealing member for sealing a portion between an inner peripheral surface of the damper head and the outer peripheral surface of the damper tube;
a first support portion provided on the damper head so as to enable the first support portion to be supported on a vehicle body of a saddle-ride vehicle;
a second support portion provided on the piston rod so as to enable the second support portion to support a rear wheel support mechanism of the saddle-ride vehicle; and
a sub-tank which communicates with an inside of the damper head, is integrated with the damper head, is arranged in parallel in the axial direction of the damper tube, is arranged laterally to the damper tube, and is arranged at a position overlapping the first nut and the second nut with reference to a height direction of the damper tube.

* * * * *